United States Patent
Das

(10) Patent No.: US 10,853,259 B2
(45) Date of Patent: Dec. 1, 2020

(54) EXITLESS EXTENDED PAGE TABLE SWITCHING FOR NESTED HYPERVISORS

(71) Applicant: Red Hat, Inc., Raleigh, NC (US)

(72) Inventor: Bandan Das, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 316 days.

(21) Appl. No.: 15/858,619

(22) Filed: Dec. 29, 2017

(65) Prior Publication Data

US 2019/0205259 A1 Jul. 4, 2019

(51) Int. Cl.
*G06F 12/00* (2006.01)
*G06F 12/1009* (2016.01)

(52) U.S. Cl.
CPC .... *G06F 12/1009* (2013.01); *G06F 2212/656* (2013.01)

(58) Field of Classification Search
CPC combination set(s) only.
See application file for complete search history.

(56) References Cited

U.S. PATENT DOCUMENTS

| | | |
|---|---|---|
| 9,213,651 B2 | 12/2015 | Malyugin et al. |
| 9,703,720 B2 | 7/2017 | Zmudzinski |
| 2008/0005447 A1 | 1/2008 | Schoenberg et al. |
| 2010/0250869 A1* | 9/2010 | Adams ............... G06F 12/0891 711/154 |
| 2014/0053272 A1 | 2/2014 | Lukacs et al. |

FOREIGN PATENT DOCUMENTS

WO 2014/209269 A1 12/2014

OTHER PUBLICATIONS

Wenhao Li, et al.; "Reducing World Switches in Virtualized Environment with Flexible Cross-world Calls"; Shanghai Key Laboratory of Scalable Computing and Systems; Shanghai Jiao Tong University; Jun. 13, 2015 (13 Pages).
M. Tim Jones; "Nested virtualization for the Next-Generation Cloud"; An introduction to nesting with KVM; Copyright IBM Corporation 2012; Aug. 22, 2012; (pp. 1-7).

* cited by examiner

*Primary Examiner* — Kalpit Parikh
(74) *Attorney, Agent, or Firm* — K&L Gates LLP

(57) ABSTRACT

A system and method of exitless extended page table switching includes a nested hypervisor writing pointer addresses to an extended page table list, where each pointer address is associated with an extended page table. The host hypervisor verifies that each pointer address corresponds to a guest physical address for one of the extended page tables. The host hypervisor then creates shadow extended page tables, each of which includes a shadow pointer address corresponding to a host physical address, writes, in a local page table list, each shadow pointer address and an index of each shadow extended page table, and loads the local page table list. The nested guest requests to switch between two extended page tables. The nested guest then identifies a matching entry for an extended page table in the local page table list and switches to the extended page table without triggering an exit.

20 Claims, 6 Drawing Sheets

EXITLESS EXTENDED PAGE TABLE SWITCHING FOR NESTED HYPERVISORS

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for exitless extended page table switching. An example method includes a nested hypervisor writing a plurality of pointer addresses to an extended page table list. Each of the plurality of pointer addresses is associated with one of a plurality of extended page tables. The host hypervisor verifies that each of the plurality of pointer addresses corresponds to a guest physical address for one of the plurality of extended page tables. The host hypervisor then creates a plurality of shadow extended page tables, each of which includes a shadow pointer address corresponding to a host physical address. The host hypervisor writes, in a local page table list, each shadow pointer address and an index of each of the plurality of shadow extended page tables, and then loads the local page table list. The nested guest requests to switch between two of the plurality of extended page tables, from a first extended page table to a second extended page table. The nested guest then identifies a matching entry for the second extended page table in the local page table list and switches to the second extended page table without triggering an exit.

Additional features and advantages of the disclosed methods and system are described in, and will be apparent from, the following Detailed Description and the Figures.

DETAILED DESCRIPTION OF EXAMPLE EMBODIMENTS

Figure 1:
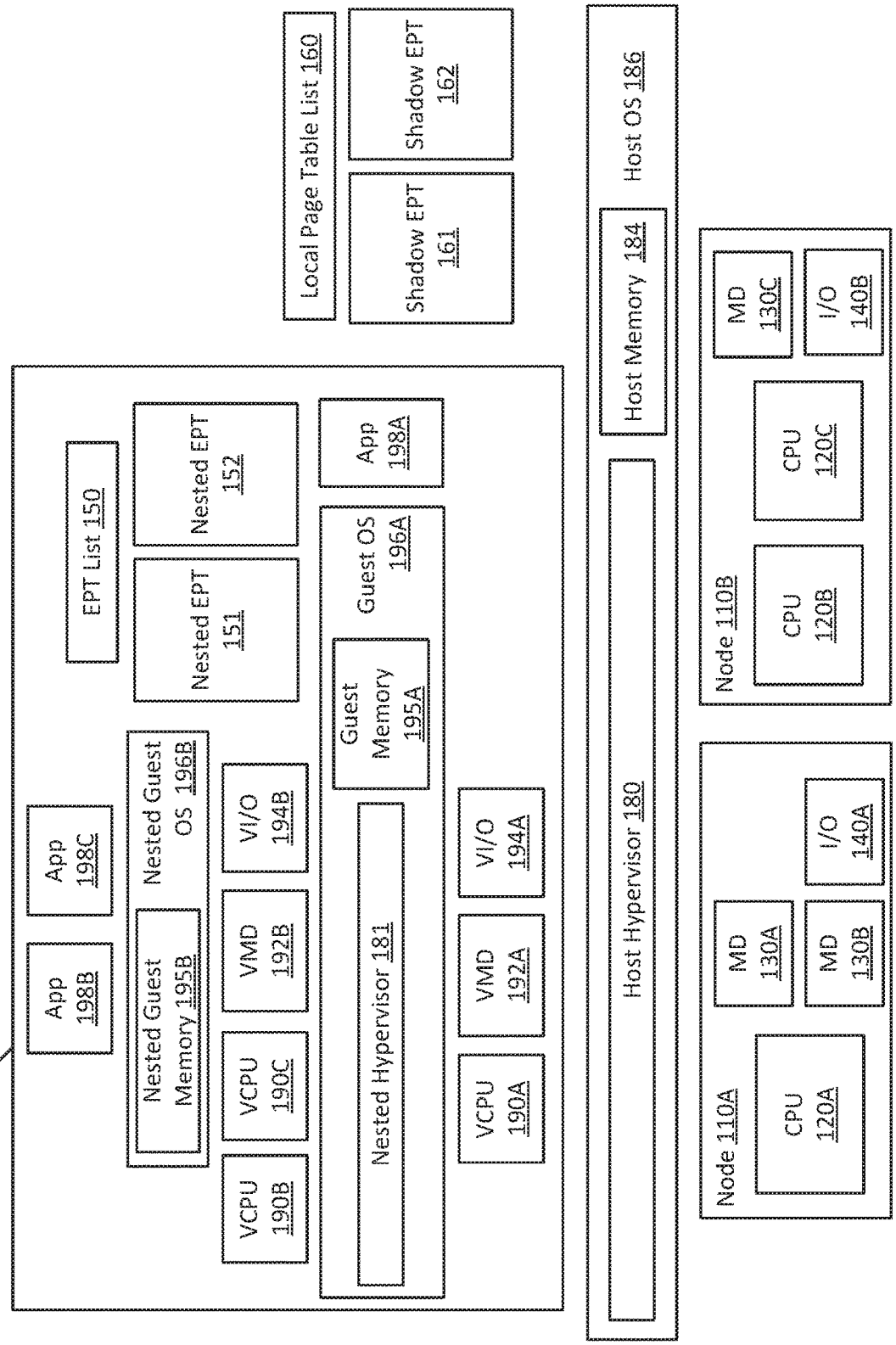
FIG. 1 is a block diagram of an example computer system according to an example of the present disclosure.

In computer systems executing a guest virtual machine, a host hypervisor may typically manage interactions with virtualized devices, such as virtual processors, virtual memory devices, and virtual input-output devices. Likewise, computer systems with a host hypervisor may also implement one or more nested hypervisors. A nested hypervisor may be used as a desirable way to pass through typical hardware virtualization extensions for performance enhancement. In systems where one or more nested hypervisors are implemented (e.g., a nested hypervisor is virtualized on top of the host hypervisor), the nested hypervisor may support (or attempt to support) interactions with virtualized devices (e.g., a virtual processor above the nested hypervisor). Nonetheless, these virtualized devices are ultimately supported by the host hypervisor. In addition to supporting virtualized devices (e.g., the virtual processor above the nested hypervisor), it is useful to support other features of computer systems, such as extended page table switching. It is therefore advantageous to optimize interactions between the host hypervisor and the nested hypervisor with respect to extended page table switching.

Typically, for example, the nested hypervisor may be required to manage loading of extended page tables on behalf of the nested guest. In this situation, if the nested guest attempts to switch between extended page tables (e.g., when memory is partitioned for security purposes), the nested hypervisor will attempt to load a new page table (e.g., via a new pointer address), which will trigger an exit (e.g., a virtual machine exit) to the host hypervisor. This is undesirable, as virtual machine exits are a source of computing inefficiency, especially in cases where frequent extended page table switching is required.

By providing support for exitless extended page table switching, computer systems may switch extended page tables (e.g., to a new extended page table or a new set of extended page tables) in a non-root mode without inducing an exit. This feature is exposed to nested hypervisors through a set of shadow extended page tables, which are loaded in lieu of extended page tables provided by the nested hypervisor. More specifically, for example, a hypervisor may create a list of extended page tables and permit the guest select a new extended page table via a privileged instruction. For example, the vmfunc instruction (e.g., vmfunc(EAX=0, ECX=index)) may be implemented, where index is the entry number of the extended page table pointer of the new extended page table that the guest (in non-root mode) wishes to switch to. This is desirable as it avoids virtual machine exits to either the host hypervisor (e.g., to load a new extended page table pointer that points to a new set of tables) or the nested hypervisor. Exitless extended page table switching may advantageously improve processing efficiency (e.g., lower processing latency, lower power usage, etc.) and permit exposure of additional and related hardware features to nested hypervisors.

FIG. 1 depicts a high-level component diagram of an example computer system 100 in accordance with one or more aspects of the present disclosure. The computer system 100 may include one or more interconnected nodes 110A-B. Each node 110A-B may, in turn, include one or more physical processors (e.g., CPU 120A-C) communicatively coupled to memory devices (e.g., MD 130A-C) and input/ output devices (e.g., I/O 140A-B). Likewise, in an example, nodes 110A-B may include a hardware device. In an example, a hardware device may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, or other similar devices.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor, which is typically capable of executing one instruction at a time (or process a single pipeline of instructions), or a multi-core processor, which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, an input/output device 140A-B refers to a device capable of providing an interface between one or more processors and an external device. The external device's operation is based on the processor inputting and/or outputting data.

Processors 120A-C may be interconnected to additional processors using a variety of techniques, ranging from a point-to-point processor interconnect to a system area network, such as an Ethernet-based network. Local connections within each node 110A-B, including the connections between a processor 120A and a memory device 130A-B, between a processor 120A and an I/O device 140A, etc., may be provided by one or more local buses of suitable architecture, for example, peripheral component interconnect (PCI). As used herein, a device of the host operating system (host OS) 186 may refer to CPU 120A-C, MD 130A-C, I/O 140A-B, a software device, and/or hardware device.

As noted above, computer system 100 may run a virtual machine 170 (also referred to herein as guest virtual machine or guest), by executing a software layer (e.g., hypervisor 180, also referred to herein as host hypervisor 180) above the hardware and below the virtual machine 170, as schematically shown in FIG. 1. In an example, the host hypervisor 180 may be a component of the host operating system 186 executed by the computer system 100. In another example, the host hypervisor 180 may be provided by an application running on the host operating system 186, or may run directly on the computer system 100 without an operating system beneath it. The host hypervisor 180 may virtualize the physical layer, including processors, memory, and I/O devices, and present this virtualization to the virtual machine 170 as devices, including virtual processors (e.g., VCPU 190A), virtual memory devices (e.g., VMD 192A), and/or virtual I/O devices (e.g., VI/O 194A). Virtual machine 170 may run on any type of dependent, independent, compatible, and/or incompatible applications on the underlying hardware and OS 186.

In an example, applications 198A-C run on the virtual machine 170 may be dependent on the underlying hardware and/or OS 186. In another example, applications 198A-C run on the virtual machine 170 may be independent of the underlying hardware and/or OS 186. Additionally, applications 198A-C run on the virtual machine 170 may be compatible with the underlying hardware and/or OS 186. In an example, a device may be implemented as virtual machine 170.

In an example, the virtual machine 170 may execute a guest operating system (guest OS) 196A which may utilize the underlying VCPU 190A, VMD 192A, and VI/O device 194A. One or more applications 198A-C may be running on virtual machine 170 under the guest operating system 196A. Processor virtualization may be implemented by the host hypervisor 180 scheduling time slots on one or more physical processors 120A-C such, that from the guest operating system's perspective, those time slots are scheduled on virtual processor 190A.

The host hypervisor 180 controls and limits access to memory (e.g., memory allocated to the virtual machine 170 and memory allocated to the guest operating system 196A, such as guest memory 195A provided to guest operating system 196A). For example, guest memory 195A may be divided into a plurality of memory pages. Access to these memory pages is controlled and limited by the host hypervisor 180. Likewise, for example, guest memory 195A allocated to the guest operating system 196A is mapped from host memory 184, such that when a guest application 198A-C or a device uses or accesses a memory page of guest memory 195A, the guest application 198A-C is actually using or accessing host memory 184. Host memory 184 may also be referred to as host physical memory, as it physically exists on a computer system (e.g., system 100).

Virtual machine 170 and, more particularly, guest operating system 196A may include additional virtualized components, which are effectively supported by the host hypervisor 180 in a similar way. For example, guest operating system 196A may include a nested hypervisor 181. A nested guest operating system 196B (which may also be referred to herein as nested virtual machine or nested guest) and a nested guest memory 195B may run on the nested hypervisor 181. The nested hypervisor 181 may control and limit access to memory (e.g., memory allocated to the nested guest operating system 196B, such as nested guest memory 195B). The nested hypervisor 181 may virtualize a layer, including processors, memory, and I/O devices, and present this virtualization to virtual machine 170 as devices, including virtual processors (e.g., VCPU 190B-C), virtual memory devices (e.g., VMD 192B), and/or virtual I/O devices (e.g., VI/O 194B). For example, nested hypervisor 181 has virtual processors (e.g., VCPU 190B, VCPU 190C, etc.) allocated to it; however, in practice, the host hypervisor 180 is actually supporting device management (e.g., via VCPU 190A).

The nested hypervisor 181 may also virtualize nested extended page tables ("EPT") (e.g., nested EPTs 151, 152). The nested EPTs 151, 152 may be used to store mappings, bits, identifiers, etc. In an example, nested EPTs 151, 152 are implemented to partition memory (e.g., for security purposes). The nested hypervisor 181 and/or the host hypervisor 180 may access the nested EPTs 151, 152 (e.g., to identify mappings and bits, store mappings and bits, modify mappings and bits). Computer system 100 may further include an EPT list 150. For example, the EPT list 150 may include a listing of addresses (e.g., pointer addresses corresponding to guest physical addresses for each of the nested EPTs 151, 152). Similarly, the host hypervisor 180 may virtualize shadow EPTs 161, 162. The shadow EPTs 161, 162 may be used to store mappings, bits, identifiers, etc. The nested hypervisor 181 and/or the host hypervisor 180 may access the shadow EPTs 161, 162 (e.g., to identify mappings and bits, store mappings and bits, modify mappings and bits). Computer system 100 may further include a local page table list 160 (e.g., a shadow EPT list). For example, the local page table list 160 may include a listing of addresses (e.g., shadow pointer addresses corresponding to host physical addresses for each of the shadow EPTs 161, 162). The local page table list 160 may further include indices for each of the shadow EPTs 161, 162.

Figure 2:
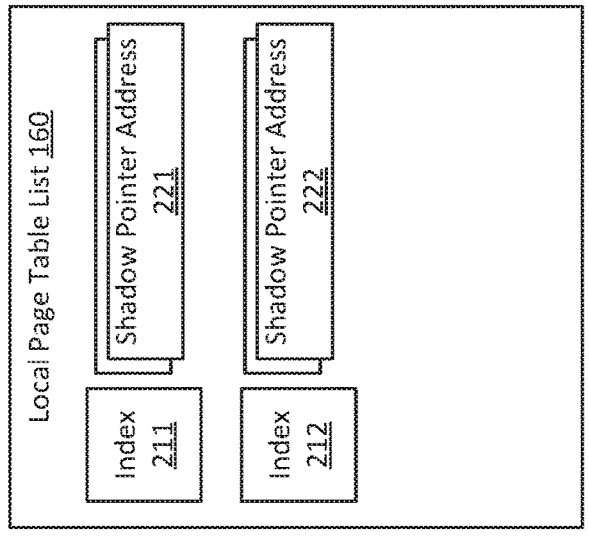
FIG. 2 is block diagram illustrating an example system of exitless extended page table switching according to an example of the present disclosure.
Figure 2:
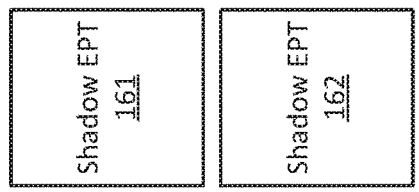
Figure 2:
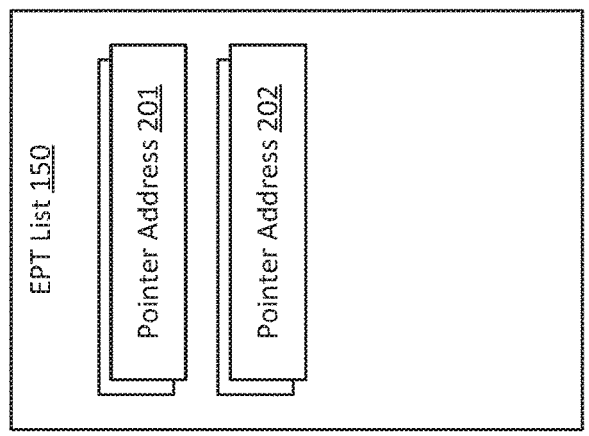
Figure 2:
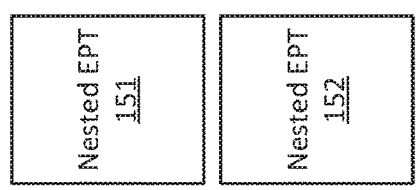

FIG. 2 is block diagram illustrating an example system of exitless extended page table switching according to an example of the present disclosure. More particularly, configuration 200 illustrates relationships between page tables, lists, and addresses and indices stored therein. For example, configuration 200 illustrates a pointer address 201 and a pointer address 202, each of which are stored in the EPT list 150. It should be appreciated that, while two pointer addresses are used for illustrative purposes, many other quantities of pointer addresses (e.g., three or more) could be included in the EPT list 150. Each of the pointer addresses 201, 202 is associated with a nested EPT 151, 152. For example, the pointer address 201 is associated with nested EPT 151. In an example, the pointer address 201 corresponds to a guest physical address (e.g., an address in guest memory 195A or nested guest memory 195B) for nested EPT 151. Similarly, for example, the pointer address 202 is associated with nested EPT 152. In an example, the pointer address 202 corresponds to a guest physical address (e.g., an address in guest memory 195A or nested guest memory 195B) for nested EPT 152. In an example, nested EPTs 151, 152 map nested guest physical addresses to nested hypervisor physical addresses (e.g., an address in guest memory 195A).

Likewise, configuration 200 illustrates a shadow pointer address 221 and a shadow pointer address 222, each of which are stored in the local page table list 160. It should be appreciated that, while two shadow pointer addresses are used for illustrative purposes, many other quantities of shadow pointer addresses (e.g., three or more) could be included in the local page table list 160. Each of the shadow pointer addresses 221, 222 is associated with a respective shadow EPT 161, 162. For example, the shadow pointer address 221 is associated with the shadow EPT 161. In an example, the shadow pointer address 221 corresponds to a host physical address (e.g., an address in host memory 184) for the shadow EPT 161. Similarly, for example, the shadow pointer address 222 is associated with the shadow EPT 162. In an example, the shadow pointer address 222 corresponds to a host physical address (e.g., an address in host memory 184) for the shadow EPT 162. In an example, each entry in the local page table list 160 further includes an index. For example, local page table list 160 includes a first index 211 for the shadow pointer address 221, local page table list 160 includes a second index 212 for the shadow pointer address 221, etc. In an example, each of the first index 211 and the second index 212 are entry numbers of the respective shadow pointer address 221 and shadow pointer address 222. For example, each of the first index 211 and the second index 212 may be entries for a privileged instruction. In an example, each of the first index 211 and the second index 212 are a link between the EPT list 150 and the local page table list 160. For example, the first index 211 links the pointer address 201 in the EPT list 150 with the shadow pointer address 221 in the local page table list 160. Likewise, for example, the second index 212 links the pointer address 202 in the EPT list 150 with the shadow pointer address 222 in the local page table list 160. In an example, shadow EPTs 161, 162 map nested guest physical addresses to host physical addresses (e.g., an address in host memory 184).

Figure 3:
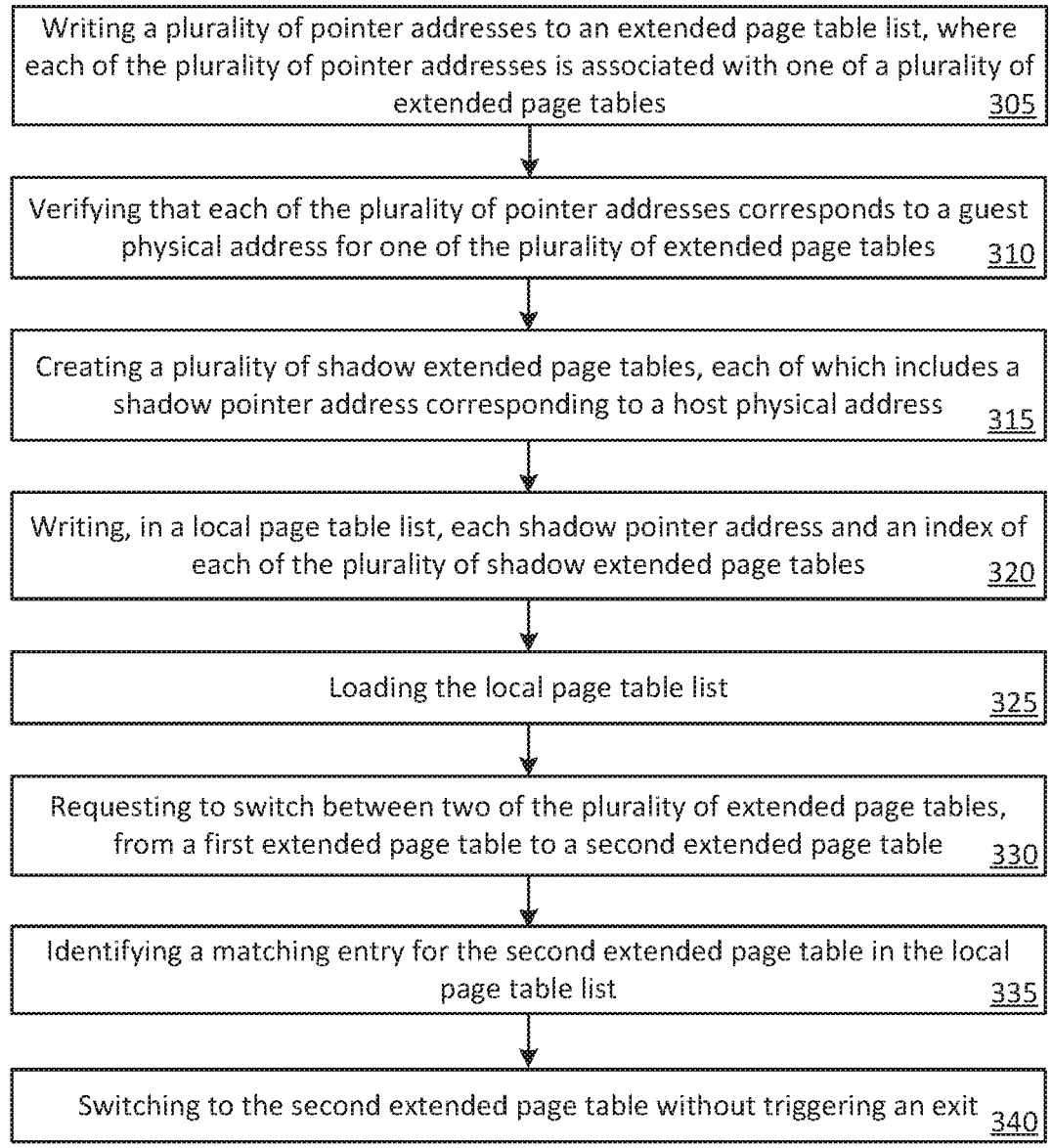
FIG. 3 is a flowchart illustrating an example method of exitless extended page table switching according to an example of the present disclosure.

FIG. 3 is a flowchart illustrating an example method of exitless extended page table switching according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by host hypervisor 180 interacting with nested hypervisor 181, virtual machine 170, nested guest OS 196B, EPT list 150, and local page table list 160.

The example method 300 may start with writing a plurality of pointer addresses to an extended page table list, where each of the plurality of pointer addresses is associated with one of a plurality of extended page tables (block 305). For example, nested hypervisor 181 writes a pointer address 201 and a pointer address 202 to EPT list 150. In an example, the pointer address 201 is associated with nested EPT 151, while the pointer address 202 is associated with nested EPT 152. The example method 300 includes verifying that each of the plurality of pointer addresses corresponds to a guest physical address for one of the plurality of extended page tables (block 310). For example, host hypervisor 180 verifies that the pointer address 201 corresponds to a guest physical address for nested EPT 151. Likewise, for example, host hypervisor 180 verifies that the pointer address 202 corresponds to a guest physical address for nested EPT 152.

The example method 300 includes creating a plurality of shadow extended page tables, each of which includes a shadow pointer address corresponding to a host physical address (block 315). For example, host hypervisor 180 creates a first shadow EPT 161, which includes a shadow pointer address 221 corresponding to a host physical address. Likewise, for example, host hypervisor 180 creates a second shadow EPT 162, which includes a shadow pointer address 222 corresponding to a host physical address. The example method 300 includes writing, in a local page table list, each shadow pointer address and an index of each of the plurality of shadow extended page tables (block 320). For example, host hypervisor 180 writes the shadow pointer address 221 and a first index 211 in the local page table list 160. Likewise, for example, host hypervisor 180 writes the shadow pointer address 222 and a second index 212 in the local page table list 160. In an example, each of the shadow pointer addresses 221, 222 are valid addresses.

The example method 300 includes loading the local page table list (block 325). For example, host hypervisor 180 loads the local page table list 160, including valid shadow pointer addresses 221, 222, onto the nested guest OS 196B. The example method 300 includes requesting to switch between two of the plurality of extended page tables, from a first extended page table to a second extended page table (block 330). For example, the nested guest OS 196B requests to switch from nested EPT 151 to nested EPT 152.

The example method 300 includes identifying a matching entry for the second extended page table in the local page table list (block 335). For example, the nested guest OS 196B identifies a matching entry for nested EPT 152 in the local page table list 160. In an example, the matching entry for nested EPT 152 is shadow EPT 162. In an example, the nested guest OS 196B uses at least one of the shadow pointer address 222 and the index 212 to identify the matching entry (e.g., shadow EPT 162).

The example method 300 includes switching to the second extended page table without triggering an exit (block 340). For example, the nested guest OS 196B switches from nested EPT 151 to nested EPT 152 without triggering an exit from virtual machine 170. In an example, by switching from nested EPT 151 to nested EPT 152, the nested guest OS 196B accesses nested EPT 152 in the same ways that it was previously accessing nested EPT 151 (e.g., for storing mappings, bits, identifiers, etc.). In an example, while the nested guest OS 196B effectively switches from nested EPT 151 to nested EPT 152, it is actually the processor (e.g., VCPU 190A) that switches access (e.g., the nested guest OS 196B's access) from nested EPT 151 to nested EPT 152. For example, the processor (e.g., VCPU 190A) switches access responsive to execution of a privileged instruction (e.g., vmfunc).

Figure 4A:
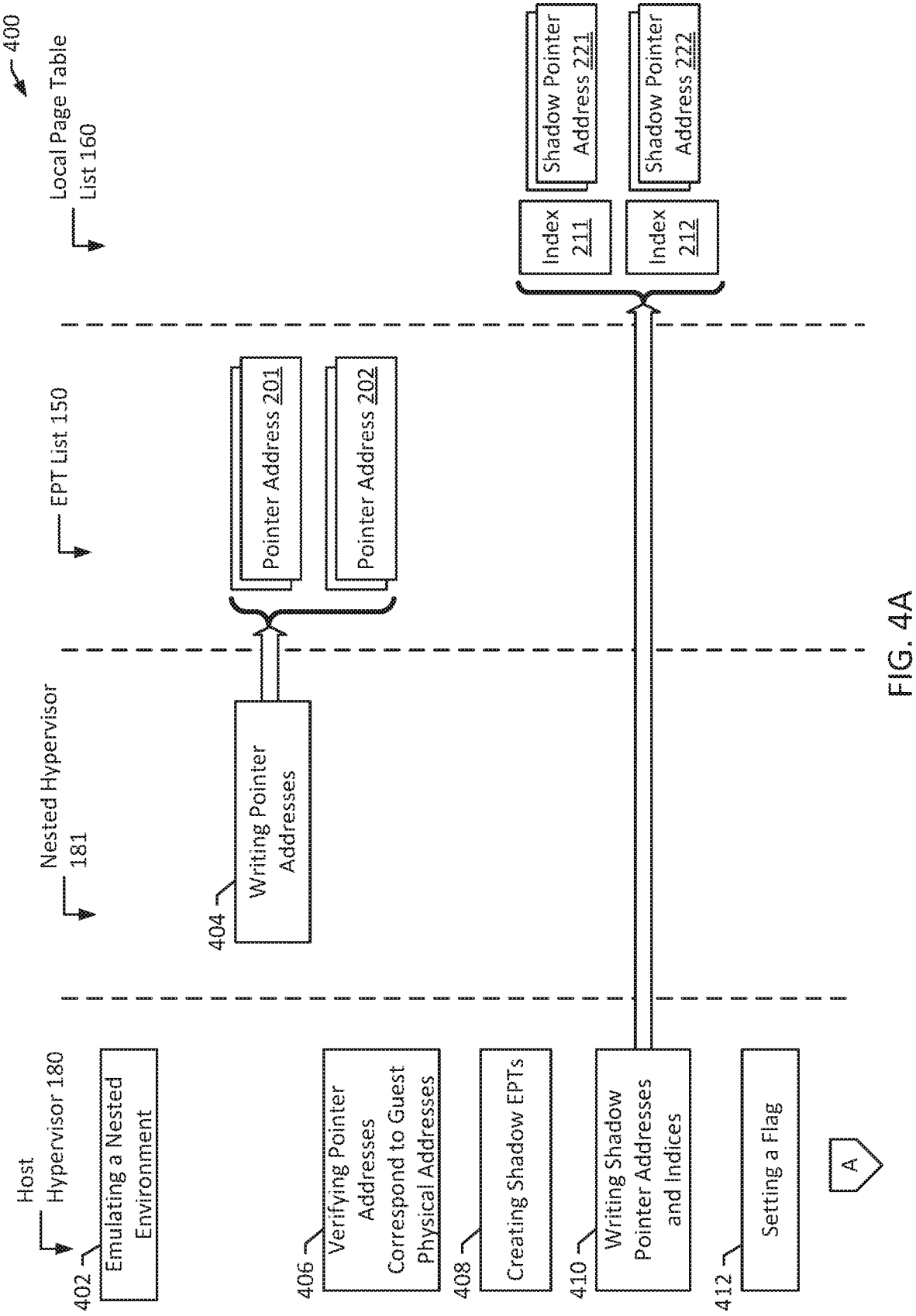
FIGS. 4A-B are flow diagrams illustrating exitless extended page table switching according to an example of the present disclosure.
Figure 4B:
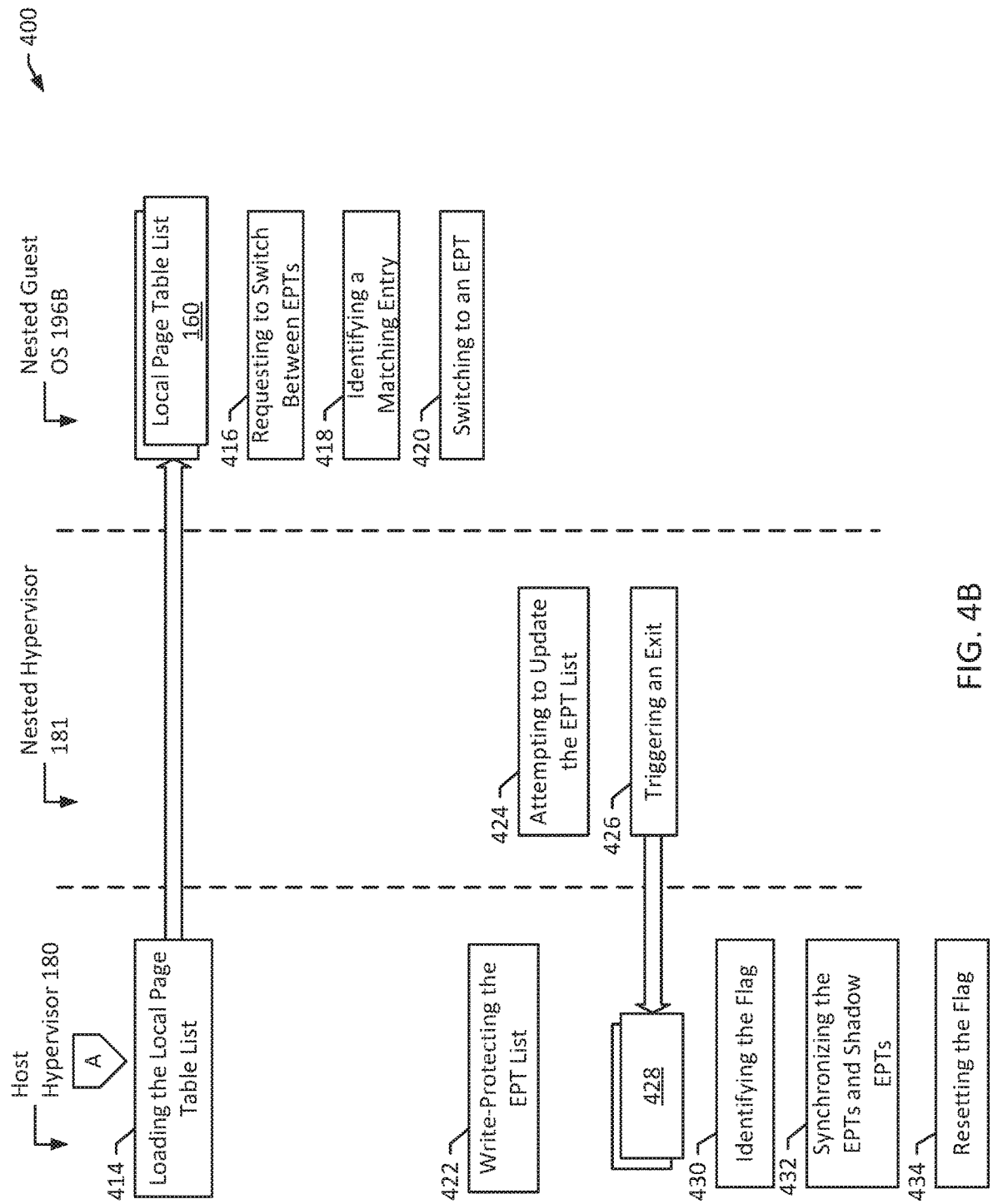

FIGS. 4A-B are flow diagrams illustrating exitless extended page table switching according to an example of the present disclosure. Although the example method 400 is described with reference to the flow diagram illustrated in FIGS. 4A-B, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method 400 may be performed by host hypervisor 180 interacting with nested hypervisor 181, nested guest OS 196B, EPT list 150, and local page table list 160.

In the illustrated example in FIG. 4A, the host hypervisor 180 emulates a nested environment (block 402). For example, host hypervisor 180 emulates virtual machine 170, which includes nested hypervisor 181, nested guest memory 195B, and nested guest OS 196B, which is virtualized by nested hypervisor 181. Host hypervisor 180 may further emulate nested EPTs 151, 152. The nested hypervisor 181 writes the pointer address 201 and the pointer address 202 to EPT list 150 (block 404). In an example, the pointer address 201 is associated with nested EPT 151, while the pointer address 202 is associated with nested EPT 152. The host hypervisor 180 verifies that the pointer addresses correspond to guest physical addresses (block 406). For example, host hypervisor 180 verifies that the pointer address 201 corresponds to a guest physical address for nested EPT 151. Likewise, for example, host hypervisor 180 verifies that the pointer address 202 corresponds to a guest physical address for nested EPT 152.

The host hypervisor 180 creates shadow EPTs (block 408). For example, the host hypervisor 180 creates a first shadow EPT 161, which includes a shadow pointer address 221 corresponding to a host physical address. Likewise, for example, host hypervisor 180 creates a second shadow EPT 162, which includes a shadow pointer address 222 corresponding to a host physical address. In an example, the nested guest OS 196B has no knowledge of the existence of the first shadow EPT 161 and the second shadow EPT 162. For example, shadow EPTs are concealed or hidden from the nested guest OS 196B. The host hypervisor 180 writes the shadow pointer address 221 and a first index 211, and the shadow pointer address 222 and a second index 212, in the local page table list 160 (block 410). In an example, each of the first index 211 and the second index 212 are a link between the EPT list 150 and the local page table list 160. For example, the first index 211 links the pointer address 201 in the EPT list 150 with the shadow pointer address 221 in the local page table list 160. Likewise, for example, the second index 212 links the pointer address 202 in the EPT list 150 with the shadow pointer address 222 in the local page table list 160.

In an example, the local page table list 160 is stored in a local virtual machine control structure of the nested guest OS 196B. In another example, the local page table list 160 is active and loaded onto the nested guest OS 196B.

Responsive to writing the index of each of the shadow EPTs 161, 162 in the local page table list 160, the host hypervisor 180 sets a flag (block 412). For example, the flag indicates that there are valid shadow pointer addresses (e.g., valid shadow pointer address 221, 222) in the local page table list 160 associated with each of the nested EPTs 151, 152. In an example, the flag indicates that the local page table list 160 is synchronized with the EPT list 150.

Continuing on to FIG. 4B, the host hypervisor 180 loads the local page table list 160 onto the nested guest OS 196B (block 414). The nested guest OS 196B requests to switch between EPTs (block 416). For example, nested guest OS 196B requests to switch from nested EPT 151 to nested EPT 152. The nested guest OS 196B identifies a matching entry (block 418). For example, nested guest OS 196B identifies a matching entry for nested EPT 152 in the local page table list 160. In an example, the matching entry for nested EPT 152 is shadow EPT 162. In an example, the nested guest OS 196B uses one of the shadow pointer address 222 and the index 212 to identify the matching entry (e.g., shadow EPT 162). The nested guest OS 196B switches EPTs (block 420). For example, nested guest OS 196B switches from nested EPT 151 to nested EPT 152 without triggering an exit (e.g., a virtual machine exit). In an example, requesting to switch between two of the nested EPTs (e.g., from nested EPT 151 to nested EPT 152) includes execution of a privileged instruction. For example, the privileged instruction may be vmfunc. For example, the nested guest OS 196B executes vmfunc, using the shadow pointer address 222 and/or the index 212, to switch to nested EPT 152. In an example, when the nested guest OS 196B executes vmfunc to load a specific index (e.g., using index 212), the corresponding entry (e.g., shadow EPT 162) is selected from the local page table list 160 (e.g., selected by a processor, such as VCPU 190A). In a related example, this corresponding entry (e.g., shadow EPT 162) is used when switching between nested EPTs (e.g., from nested EPT 151 to nested EPT 152).

Furthermore, the host hypervisor 180 write protects the EPT list 150 (block 422). The nested hypervisor 181 may attempt to update the EPT list 150 (block 424). Responsive to this attempt to update the EPT list 150, the nested hypervisor 181 may trigger an exit 428 to the host hypervisor (block 426). In an example, the exit 428 is a virtual machine exit. In an example, responsive to triggering the exit, the host hypervisor 180 sets the flag to indicate that there are no longer shadow pointer addresses (e.g., shadow pointer address 221, 222) in the local page table list 160 associated with each of the nested EPTs 151, 152.

The host hypervisor 180 identifies the flag (block 430). For example, the host hypervisor 180 identifies that the flag indicates that there are no longer valid shadow pointer addresses (e.g., shadow pointer address 221, 222) in the local page table list 160 associated with each of the nested EPTs 151, 152. The host hypervisor 180 synchronizes the nested EPTs 151, 152 in the EPT list 150 with the shadow EPTs 161, 162 in the local page table list 160 (block 432). In an example, synchronizing includes at least one of verifying existing shadow pointer addresses, creating new shadow pointer addresses, and removing invalid shadow pointer addresses. The host hypervisor 180 then resets the flag (block 434). For example, resetting the flag indicates that there are valid shadow pointer addresses (e.g., valid shadow pointer address 221, 222) in the local page table list associated with each of the nested EPTs 151, 152. In an example, resetting the flag indicates that the local page table list 160 is synchronized with the EPT list 150.

Figure 5:
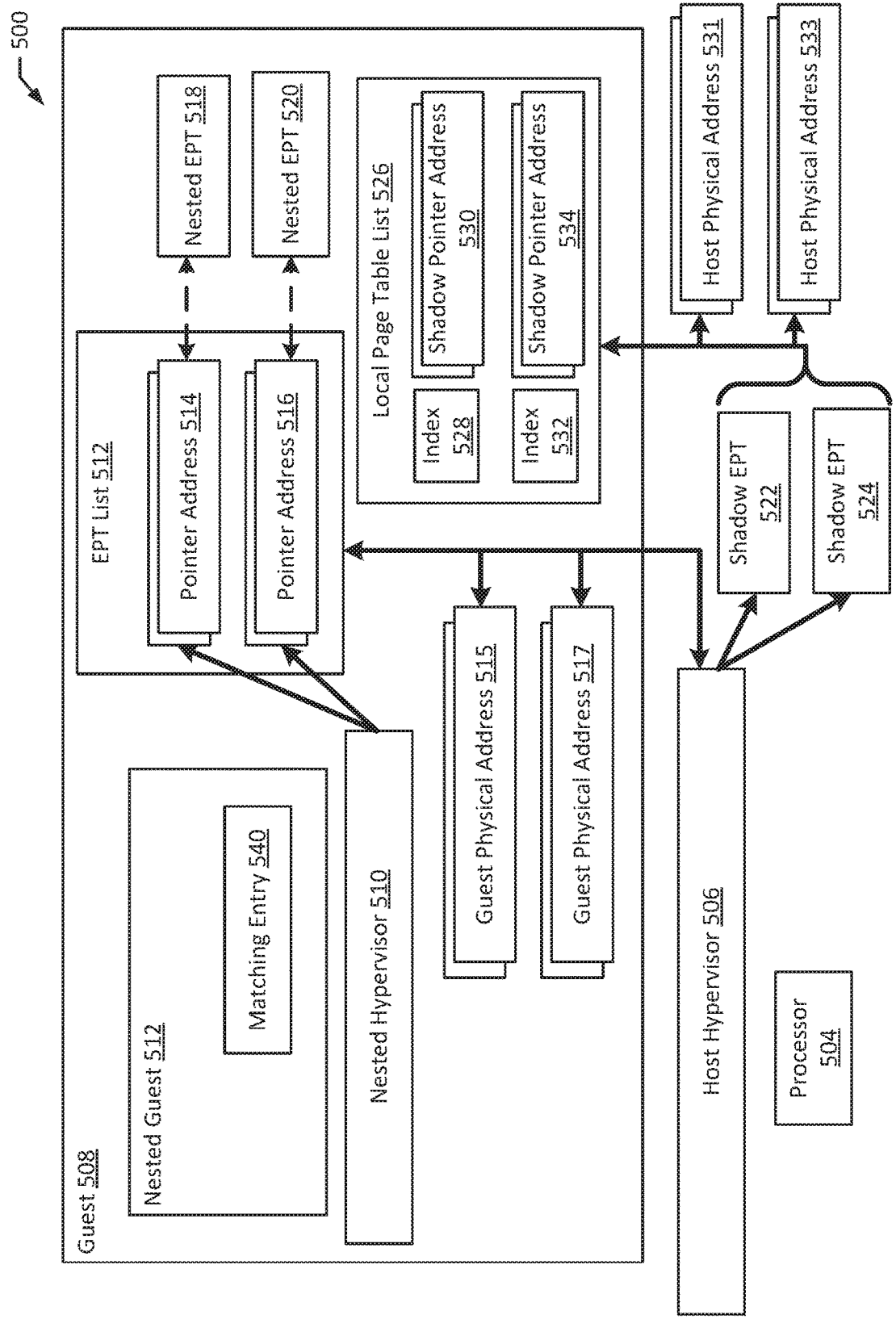
FIG. 5 is a block diagram of an example computer system according to an example of the present disclosure.

FIG. 5 is a block diagram of an example computer system 500 according to an example of the present disclosure. The computer system 500 may include a processor 504. The computer system 500 may also include a host hypervisor 506 executing on the processor 504. The computer system 500 may also include a guest 508 (e.g., virtual machine 170) executing on the processor 504. The guest 508 may include a nested hypervisor 510 and a nested guest 512. The nested hypervisor 510 writes a plurality of pointer addresses 514, 516 to an extended page table list 512. Each of the plurality of pointer addresses 514, 516 is associated with one of a plurality of extended page tables 518, 520.

The host hypervisor 506 verifies that each of the plurality of pointer addresses 514, 516 corresponds to a guest physical address 515, 517 for one of the plurality of extended page tables 518, 520. The host hypervisor 506 creates a plurality of shadow extended page tables 522, 524, each of which includes a shadow pointer address 530, 534 corresponding to a host physical address 531, 533. The host hypervisor 506 writes, in a local page table list 526, each shadow pointer address 530, 534 and an index 528, 532 of each of the plurality of shadow extended page tables 522, 524. The host hypervisor 506 loads the local page table list 526.

The nested guest 512 requests to switch between two of the plurality of extended page tables, from a first extended page table 518 to a second extended page table 520. The nested guest 512 identifies a matching entry 540 for the second extended page table 520 in the local page table list 526. The nested guest 512 switches to the second extended page table 520 without triggering an exit. Accordingly, example computer system 500 may advantageously allow for exitless extended page table switching, which improves hardware efficiency, for example, by avoiding inefficient virtual machine exits.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures. It should also be noted that a hypervisor may be referred to differently in various systems, for example, as a virtual machine monitor. Any program or component performing steps of the host hypervisor as described herein may be a hypervisor in accordance with the present disclosure.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   writing a plurality of pointer addresses to an extended page table list, wherein each of the plurality of pointer addresses is associated with one of a plurality of extended page tables;
   verifying that each of the plurality of pointer addresses corresponds to a guest physical address for one of the plurality of extended page tables;
   creating a plurality of shadow extended page tables, each of which includes a shadow pointer address corresponding to a host physical address;
   writing, in a local page table list, each shadow pointer address and an index of each of the plurality of shadow extended page tables;
   loading the local page table list;
   requesting to switch between two of the plurality of extended page tables, from a first extended page table to a second extended page table;
   identifying a matching entry for the second extended page table in the local page table list; and
   switching to the second extended page table without triggering a virtual machine exit.

2. The method of claim 1, further comprising, responsive to writing the index of each of the plurality of shadow extended page tables in the local page table list, setting a flag, which indicates that there are valid shadow pointer addresses in the local page table list associated with each of the plurality of extended page tables.

3. The method of claim 2, wherein the flag indicates that the local page table list is synchronized with the extended page table list.

4. The method of claim 2, further comprising write-protecting the extended page table list.

5. The method of claim 4, further comprising:
   attempting to update the extended page table list; and
   triggering the virtual machine exit, which sets the flag to indicate that there are no longer shadow pointer addresses in the local page table list associated with each of the plurality of extended page tables.

6. The method of claim 5, further comprising:
   identifying that the flag indicates that there are no longer valid shadow pointer addresses in the local page table list associated with each of the plurality of extended page tables;
   synchronizing the extended page tables in the extended page table list with the shadow extended page tables in the local page table list; and
   resetting the flag.

7. The method of claim 6, wherein synchronizing includes at least one of:
   verifying existing shadow pointer addresses,
   creating new shadow pointer addresses, and
   removing invalid shadow pointer addresses.

8. The method of claim 1, wherein requesting to switch between two of the plurality of extended page tables includes execution of a privileged instruction.

9. The method of claim 8, wherein the privileged instruction is vmfunc.

10. The method of claim 1, wherein the local page table list is stored in a local virtual machine control structure of the nested guest.

11. The method of claim 1, wherein the local page table list is active and loaded onto the nested guest.

12. A system comprising:
one or more physical processors;
a host hypervisor configured to execute on the one or more physical processors; and
a guest configured to execute on one or more physical processors, the guest including a nested hypervisor, and a nested guest,
wherein the nested hypervisor is configured to:
write a plurality of pointer addresses to an extended page table list, wherein each of the plurality of pointer addresses is associated with one of a plurality of extended page tables;
wherein the host hypervisor is configured to:
verify that each of the plurality of pointer addresses corresponds to a guest physical address for one of the plurality of extended page tables;
create a plurality of shadow extended page tables, each of which includes a shadow pointer address corresponding to a host physical address;
write, in a local page table list, each shadow pointer address and an index of each of the plurality of shadow extended page tables;
load the local page table list; and
wherein the nested guest is configured to:
request to switch between two of the plurality of extended page tables, from a first extended page table to a second extended page table;
identify a matching entry for the second extended page table in the local page table list; and
switch to the second extended page table without triggering a virtual machine exit.

13. The system of claim 12, further comprising, responsive to writing the index of each of the plurality of shadow extended page tables in the local page table list, setting a flag, which indicates that there are valid shadow pointer addresses in the local page table list associated with each of the plurality of extended page tables.

14. The system of claim 13, wherein the flag indicates that the local page table list is synchronized with the extended page table list.

15. The system of claim 13, further comprising write-protecting the extended page table list.

16. The system of claim 15, further comprising:
attempting to update the extended page table list; and
triggering the virtual machine exit, which sets the flag to indicate that there are no longer shadow pointer addresses in the local page table list associated with each of the plurality of extended page tables.

17. The system of claim 16, further comprising:
identifying that the flag indicates that there are no longer valid shadow pointer addresses in the local page table list associated with each of the plurality of extended page tables;
synchronizing the extended page tables in the extended page table list with the shadow extended page tables in the local page table list; and
resetting the flag.

18. The system of claim 17, wherein synchronizing includes at least one of:
verifying existing shadow pointer addresses,
creating new shadow pointer addresses, and
removing invalid shadow pointer addresses.

19. The system of claim 12, wherein requesting to switch between two of the plurality of extended page tables includes execution of a privileged instruction.

20. A computer-readable non-transitory storage medium comprising executable instructions that, when executed, are configured to cause a host hypervisor, a nested hypervisor, and a nested guest to:
write a plurality of pointer addresses to an extended page table list, wherein each of the plurality of pointer addresses is associated with one of a plurality of extended page tables;
verify that each of the plurality of pointer addresses corresponds to a guest physical address for one of the plurality of extended page tables;
create a plurality of shadow extended page tables, each of which includes a shadow pointer address corresponding to a host physical address;
write, in a local page table list, each shadow pointer address and an index of each of the plurality of shadow extended page tables;
load the local page table list,
request to switch between two of the plurality of extended page tables, from a first extended page table to a second extended page table;
identify a matching entry for the second extended page table in the local page table list; and
switch to the second extended page table without triggering a virtual machine exit.

* * * * *